(12) United States Patent
Boulot (10) Patent No.: US 6,917,287 B2
(45) Date of Patent: Jul. 12, 2005

(54) SYSTEM FOR MONITORING THE TIRES OF A VEHICLE, COMPRISING A DEVICE FOR AUTOMATIC LOCATION OF WHEEL TRANSMITTERS

(75) Inventor: Jean-Francis Boulot, Domicile (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 72 days.

(21) Appl. No.: 10/435,901

(22) Filed: May 12, 2003

(65) Prior Publication Data

US 2004/0017290 A1 Jan. 29, 2004

Related U.S. Application Data

(63) Continuation of application No. PCT/EP01/12693, filed on Nov. 2, 2001.

(30) Foreign Application Priority Data

Nov. 10, 2000 (FR) .............................................. 00 14752
May 16, 2002 (FR) .............................................. 02 39137

(51) Int. Cl.⁷ .............................................. B60C 23/00
(52) U.S. Cl. ...................... 340/447; 340/442; 73/146.4
(58) Field of Search ............................... 340/442–448; 73/146.4, 146.5

(56) References Cited

U.S. PATENT DOCUMENTS

| | | | |
|---|---|---|---|
| 4,305,074 A | 12/1981 | Barzana et al. .............. | 343/7.4 |
| 5,075,694 A | 12/1991 | Donnangelo et al. ....... | 342/455 |
| 5,600,301 A | 2/1997 | Robinson et al. ........... | 340/442 |
| 5,774,047 A | 6/1998 | Hensel, IV ................. | 340/442 |
| 6,034,597 A * | 3/2000 | Normann et al. ........... | 340/447 |
| 6,062,072 A | 5/2000 | Mock et al. ................ | 73/146.5 |
| 6,304,172 B1 | 10/2001 | Katou et al. ................ | 340/445 |
| 6,362,733 B1 * | 3/2002 | Momose et al. ............ | 340/447 |
| 6,591,671 B2 * | 7/2003 | Brown ....................... | 73/146.5 |
| 6,604,415 B2 * | 8/2003 | Imao et al. ................. | 73/146.5 |

FOREIGN PATENT DOCUMENTS

| | | |
|---|---|---|
| EP | 1004461 | 11/1999 |
| EP | 1059177 | 5/2000 |
| GB | 2168812 | 6/1986 |
| WO | 9420317 | 9/1994 |
| WO | 9706968 | 2/1997 |

* cited by examiner

Primary Examiner—Brent A. Swarthout
(74) Attorney, Agent, or Firm—Fitzpatrick, Cella, Harper & Scinto (57) ABSTRACT

System for monitoring the tires of a vehicle, comprising a device for automatic location of a radio transmitter, comprising a first radio reception channel having a first aerial and a second radio reception channel having a second aerial, the first and second aerials defining an axis D1, a first means of comparison of the phases of a radio signal received by the first and second aerials in order to determine whether the radio signal received by the first aerial is ahead of phase, behind phase or has an identical phase relative to the radio signal received by the second aerial and a means of processing the results originating from the first means of comparison intended to indicate the position of the radio transmitter relative to the said aerials.

18 Claims, 5 Drawing Sheets

SYSTEM FOR MONITORING THE TIRES OF A VEHICLE, COMPRISING A DEVICE FOR AUTOMATIC LOCATION OF WHEEL TRANSMITTERS

CROSS REFERENCE TO RELATED APPLICATIONS

This is a continuation of international application No. PCT/EP01/12693, which was filed on Nov. 2, 2001, published in French as WO 02/39137 on May 16, 2002 and claims priority to French application No. 00/14752, filed Nov. 10, 2000, the entire contents of each which are incorporated herein by reference.

BACKGROUND OF THE INVENTION

1. Field of the Invention

The invention relates to devices for automatically locating the position of a radio transmitter, and particularly a radio transmitter disposed in the wheel of a vehicle.

Systems for monitoring the pressure of a vehicle's tires conventionally comprise wheel units with an integral radio transmitter which regularly transmits to a central unit for processing data originating from sensors, in particular inflation pressure and temperature, as well as an identification code. The wheel units are disposed in each wheel-tire assembly of the vehicle and the central processing unit is located in the vehicle chassis. Each wheel unit has an identification code particular to it.

2. The Related Art

WO 94/20317 and U.S. Pat. No. 5,600,301 disclose a tire monitoring system. In order to function correctly, the central processing unit should have the positions of the wheel units on the vehicle with their identification codes stored in its memory. This is imperative in order to check the origin of the signals received, and thus to avoid interference with other vehicles potentially equipped in a similar manner. It is also imperative if it is to be possible to indicate the relevant tire in the case of a fault, such as, for example, a loss of pressure.

In the case of devices similar to that of the application WO 94/20317 and U.S. Pat. No. 5,600,301, this identification is carried out manually at the time when the system is first put into operation.

WO 97/06968 and U.S. Pat. No. 6,062,072 describe a device for monitoring the tires of a vehicle in which the central processing unit is connected to four receivers each disposed directly opposite one of the four wheels of the vehicle. According to the strength of the radio signal received, it is easy to determine which is the transmitter at the source of the signal received. This device, however, has the disadvantage of requiring four receivers within immediate proximity of the four wheels and of the need to connect each of these receivers electrically to the central processing unit. This makes the installation of such a system in a vehicle expensive.

SUMMARY OF THE INVENTION

An object of the invention is to provide a system for monitoring the tires of vehicle.

Another object of the present invention is to provide a system for monitoring the tires of a vehicle that does not require conventional goniometric radio solutions (Doppler effect, rotary aerials etc.) in order to determine the provenance of a radio signal. Such solutions can be expensive and may have difficulty determining the position of a transmission of a few milliseconds.

In order to achieve these objectives, the present invention provides for a first system for monitoring the tires of a vehicle having two axles, each axle being equipped with a tire-wheel assembly and the two tire-wheel assemblies defining an axis D1 comprising a wheel unit disposed in each of the tire-wheel assemblies with a radio transmitter transmitting waves of a frequency F of more than 300 MHz in short pulses, a central unit for processing the data transmitted by the transmitters of the wheel units, and a device for automatically locating the position on the vehicle of the radio transmitters, intended to be disposed in the chassis of the vehicle. This system is such that the automatic locating device comprises:

a first radio reception channel having a first aerial;

a second radio reception channel having a second aerial, the first and second aerials defining an axis intended to be disposed substantially parallel to D1 and being separated by a distance d such that, $\lambda$ being the wavelength of the frequency F of the radio transmissions of the transmitters, d satisfies the following equation:

$(2n+1)\lambda/4-\lambda/8 \leq d \leq (2n+1)\lambda/4+\lambda/8$, $n$ being an integer, $n \geq 0$;

first means of comparison of the phases of a radio signal received by the first and second aerials in order to determine whether the radio signal received by the first aerial is ahead of phase, behind phase or has an identical phase relative to the radio signal received by the second aerial; and means of processing the results transmitted by the first means of comparison intended to indicate the position of the radio transmitter relative to the said aerials.

In a preferred embodiment, this first system is intended, in particular, for a two-wheel vehicle.

This device analyses the relative phase of signals originating from two receiving aerials. The relative phase of these signals can be determined without ambiguity due to the known spacing of the two receiving aerials. This spacing d is preferably equal to $\lambda/4$.

A further object of the invention is a system for monitoring the tires of a vehicle having two axles, each axle being equipped with two tire-wheel assemblies and the four tire-wheel assemblies defining two diagonals D1 and D2, comprising a wheel unit disposed in each of the tire-wheel assemblies with a radio transmitter transmitting waves of a frequency F of more than 300 MHz in short pulses, a central unit for processing the data transmitted by the transmitters of the wheel units, and a device for automatically locating the position on the vehicle of the radio transmitters, intended to be disposed in the chassis of the vehicle. This second system is such that the automatic locating device comprises:

a first radio reception channel having a first aerial;

a second radio reception channel having a second aerial, the first and second aerials defining an axis intended to be disposed substantially parallel to D1 and being separated by a distance d such that, $\lambda$ being the wavelength of the frequency F of the radio transmissions of the transmitters, d satisfies the following equation:

$(2n+1)\lambda/4-\lambda/8 \leq d \leq (2n+1)\lambda/4+\lambda/8$, $n$ being an integer, $n \geq 0$;

first means of comparison of the phases of a radio signal received by the first and second aerials in order to determine whether the radio signal received by the first aerial is ahead of phase, behind phase or has an identical phase relative to the radio signal received by the second aerial;

a third radio reception channel having a third aerial;

a fourth radio reception channel having a fourth aerial, the third and fourth aerials defining an axis intended to be disposed substantially parallel to D2 and being separated by a distance such that, λ being the wavelength of the frequency F of the radio transmissions of the transmitters, d' satisfies the following equation:

$(2n+1)\lambda/4-\lambda/8 \leq d' \leq (2n+1)\lambda/4+\lambda/8$, $n$ being an integer, $n \geq 0$;

second means of comparison of the phases of a radio signal received by the third and fourth aerials in order to determine whether the radio signal received by the third aerial is ahead of phase, behind phase or has an identical phase relative to the radio signal received by the fourth aerial;

means of processing the results originating from the first and second means of comparison intended to indicate the position of the radio transmitter of the signal relative to the said aerials.

In a preferred embodiment, this second system is intended, in particular, for four-wheel vehicles.

In a preferred embodiment, the first and third radio reception channels are shared.

As above, the distances d and d' separating each pair of aerials are preferably substantially equal to $\lambda/4$.

With this automatic locating device, it is possible to determine easily the position of a radio transmitter disposed substantially along the axis D1 or the axis D2. As the aerials are spaced by a distance equal to one quarter of the wavelength, the radio signals received by two co-operating aerials will be out of phase with one another by a value close to 90 degrees.

When the device is assembled on a vehicle equipped with two axles and four wheels, it is advantageous to dispose the two axes defined by the two pairs of aerials substantially along the diagonals D1 and D2 of the four wheels. The processing means of the device can then easily indicate the source of the radio signal received. The axis on which the wheel transmitter is located is determined by the couple of co-operating aerials which receives signals out of phase by 90 degrees; and the quadrant of the plane containing D1 and D2, in which the transmitter is located, is determined by the aerial which receives a signal that is ahead of phase.

This principle is fully applicable to systems for monitoring the pressure of the tires, for taking into account the position of the aerials relative to the transmitters, a precision of ±45 degrees is sufficient. This device also has the advantage of permitting reliable locating of signals, even with signals corresponding to short pulses, albeit of very short duration, such as for only a few milliseconds.

The system according to the invention also has the advantage of permanently verifying the correct relative position of the wheels. It can reallocate automatically the identification codes of the wheel units to the correct positions in the memory of the central processing unit.

In order to increase the reliability of determining, the processing means of the device can only indicate that the radio transmitter is disposed on the side of a specified aerial, relative to an axis D1, or D2 respectively, only if the second, or first respectively, means of comparison record that the signals received by the corresponding pair of aerials are substantially in phase.

According to an advantageous feature, the processing means indicate "zero signal" when the first and second means of comparison both record that the signals received by the corresponding pairs of aerials have substantially the same phase shift.

It is thereby possible to identify, for example, that the radio signal received originates from a radio transmitter disposed in the spare wheel of the vehicle if the vehicle is equipped with such. In fact, the spare wheels are usually disposed substantially at the front or at the back of the vehicle, at the center thereof.

The transmission frequency of the radio transmitters of the wheel units is more than 300 MHz. In the case of lower frequencies, the principle according to the invention can no longer be applied easily due to the fact that the distance by which the co-operating aerials are to be separated is too great. On the other hand, for a frequency of 433 MHz, for example, the wavelength of the signals is 70 cm, the distance d ($\lambda/4$) is then 17 cm and can be reduced to 8 cm ($\lambda/8$). This makes it possible to enclose the entire device in a very small housing with sides of 10×10×3 cm for example. Such a device may also incorporate the central processing unit of the monitoring system and all its functions, including the function of checking and sending data to an indicator in the passenger compartment of the vehicle.

Preferably the aerials comprise a helical winding such that the unwound length of the winding wire is substantially equal to a quarter of the wavelength of the frequency of the radio transmitters. Advantageously, the aerial windings have their axes intended to be disposed substantially perpendicular to the axes D1 and D2.

The locating device is preferably disposed in the chassis of the vehicle, such as, for example, in the center thereof. A particularly preferred position is under the chassis. Another advantageous position is in the central part of the ceiling of the passenger compartment of the vehicle.

According to an advantageous embodiment, one of the reception channels of the radio signal of the locating device is used to receive and decode the data originating from the wheel unit transmitting to the central processing unit.

A complementary reception channel may also be provided in order to receive and decode the data of the wheel unit transmitting to the central processing unit.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DETAILED DESCRIPTION OF THE INVENTION

Reference will now be made in detail to the present invention.

Figure 1:
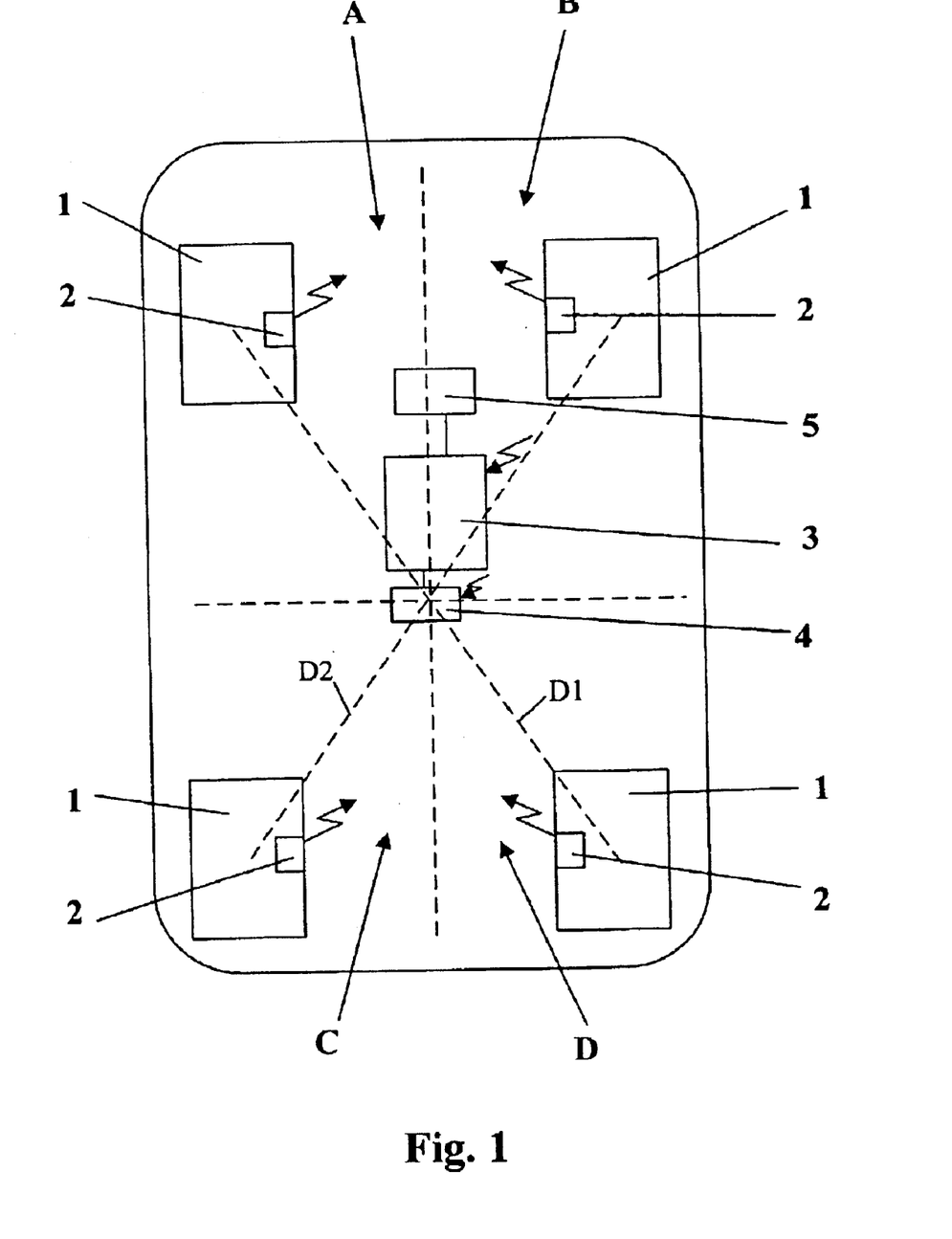
FIG. 1 shows, diagrammatically, the implantation in a four-wheel vehicle of a tire monitoring system.

FIG. 1 shows diagrammatically the implantation in a vehicle with two axles and four wheels of a tire-monitoring system according to the invention. The vehicle comprises four tire-wheel assemblies 1. The tire-monitoring system comprises a wheel unit 2 disposed inside the inner cavity of each tire. The tire monitoring system may be equipped with a radio transmitter and/or pressure and temperature sensors, a central processing unit 3, a device 4 for automatically locating the radio transmitters, and/or an indicator 5. The central processing unit 3 and the automatic locating device may be disposed in the chassis of the vehicle and the indicator 5 may be situated in the passenger compartment. The centers of the tire-wheel assemblies define two diagonals D1 and D2, and the chassis is divided into four quadrants A, B, C and D, as is indicated in the drawing. In the example of FIG. 1, the central processing unit 3 and the automatic locating device 4 are both equipped with radio reception and/or transmission channels. In this embodiment, the device 4 is only used to identify the location of the wheel unit transmitting the signals received. It is also possible to integrate the two units more fully, such as by using one of the radio reception channels of the device 4 to receive and transmit the signals to the central processing unit 3. In the same way, here the two units 3 and 4 have been shown as separate elements, but it is entirely possible to integrate them into one housing.

Figure 2:
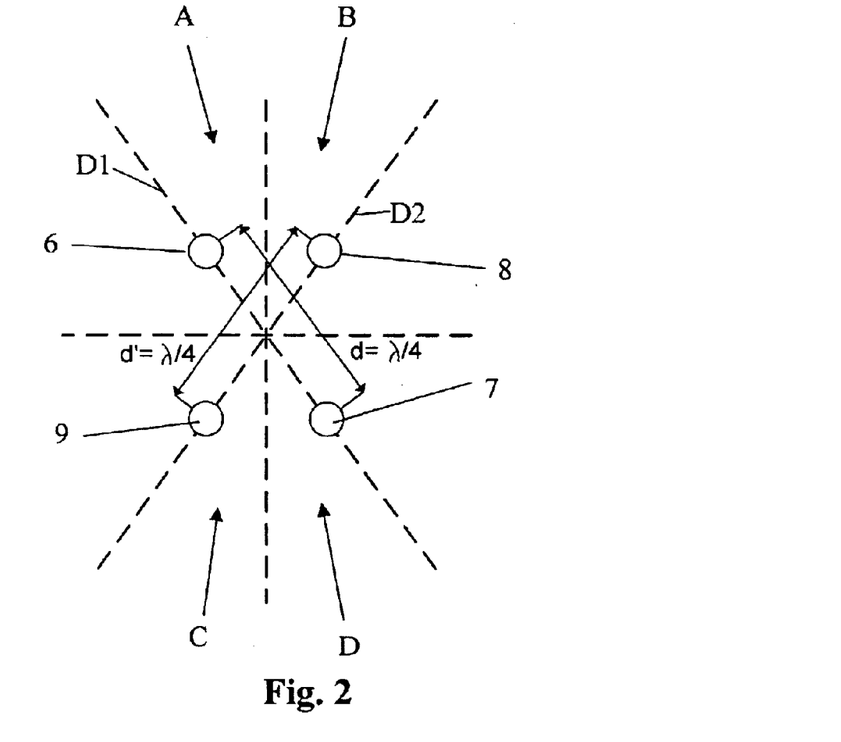
FIG. 2 shows the position of the receiving aerials of a four-aerial device

FIG. 2 shows diagrammatically the implantation of the four reception aerials in the case of a four-wheel vehicle. This figure is an enlargement of the element 4 in FIG. 1. The aerials 6, 7, 8 and 9 are disposed close to the center of the vehicle, in the chassis and preferably below the chassis in order to facilitate the transmission of radio signals between the transmitters that are disposed in the wheels and the reception aerials.

The four aerials are arranged in twos. The aerial 6 and the aerial 7 lying substantially along the axis D1 connecting the axes of two of the wheels in a diagonal. The aerials 8 and 9 are substantially disposed along the second axis D2 connecting the axes of the last two wheels in a diagonal. A distance d equal to a quarter of the wavelength of the radio transmissions separates the aerials 6–7 as well as 8–9. For a frequency of 433 MHz, the wavelength is 70 cm, and d is therefore 15 to 18 cm in a preferred embodiment, the four aerials can be helical aerials, comprising a winding whose unwound length is also substantially equal to a quarter of the wavelength of the radio transmission. Aerials of this kind, known as tuned aerials, afford a good output combined with small size and low cost.

The four aerials are disposed virtually in a square, each one therefore defining a quadrant in the plane of the axes D1 and D2. The aerial 6 is in the quadrant A, the aerial 7 in the quadrant D, the aerial 8 in the quadrant B, and the aerial 9 in the quadrant C.

The spacing of two aerials by this distance (λ/4) brings about at the most a phase shift of reception of the signals of 90 degrees.

Figure 3:
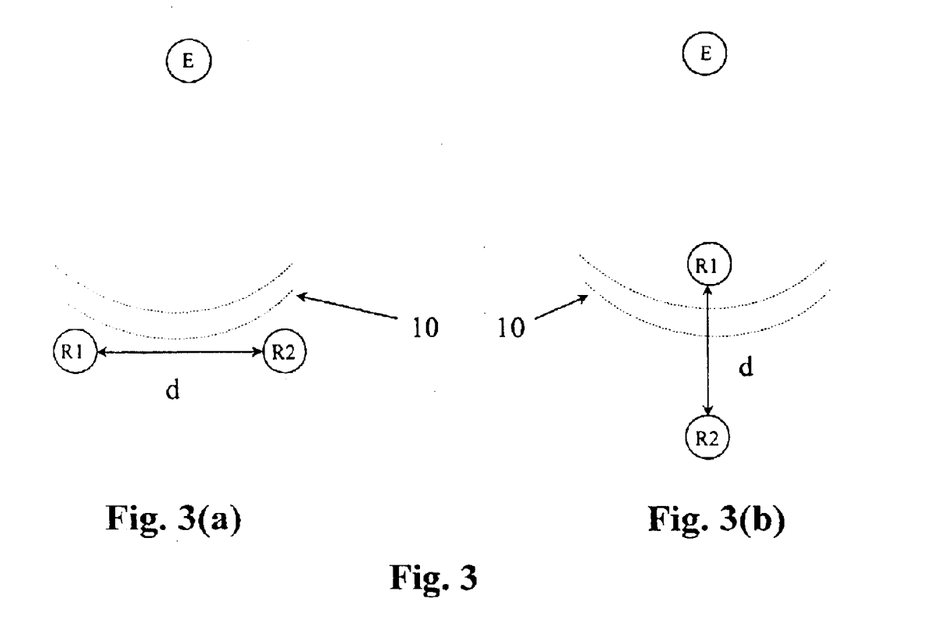
FIG. 3 illustrates the principle of location by measuring the phase shift.

FIG. 3(a) shows a transmitter E, wave fronts 10 of a radio transmission of this transmitter, and two receiving aerials R1 and R2, which are equidistant from the transmitter E.

Figures 4, 4A, 4B, 4C:
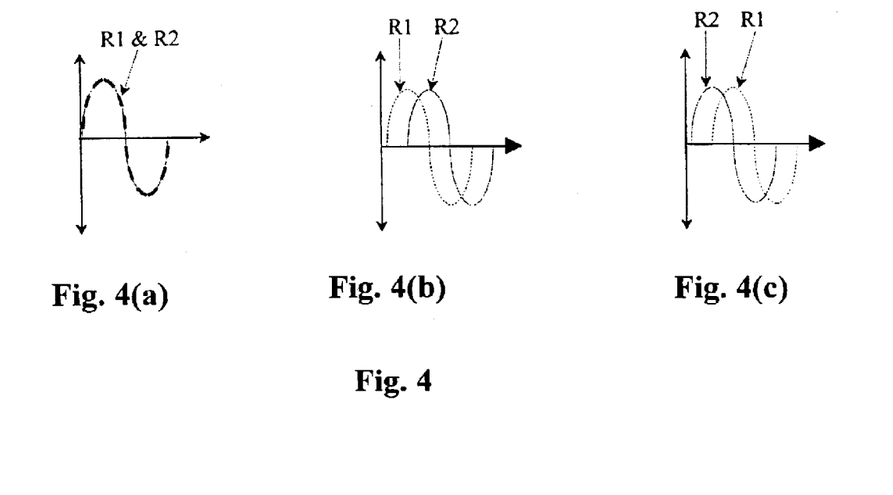
FIGS. 4(a), 4(b) and 4(c) illustrate the signals picked up and their phase shift.

As FIG. 4(a) shows, since the distances E-R1 and E-R2 are equal, the signals received by R1 and R2 are in phase.

FIG. 3(b) shows another embodiment of the present invention, in which the two receivers R1 and R2 are disposed along an axis passing through the transmitter E. In this case, the distances E-R1 and E-R2 differ by a quarter of the wavelength of the signals, with the result that, as is shown in FIGS. 3(b) and 4(b), the signals received by R1 are 90 degrees ahead of phase compared to those received by R2.

FIG. 4(c) illustrates another embodiment of the present invention, in which the transmitter E is disposed along an axis passing through the two receivers R1 and R2, but is closer to R2 than to R1. In this embodiment, the signals received by R2 are then 90 degrees ahead of phase compared to those received by R1.

After comparison of their phases, the signals are processed by a position detection logic.

By way of example, each phase comparator co-operating with a first and a second aerial produces a signal corresponding to:

Source at an equal distance from the two aerials=0.
Source closer to the first aerial=+1.
Source closer to the second aerial=−1.

The table below indicates the logic giving the quadrant of the transmitter of the signals received with reference to FIG. 2:

| Couple of aerials 6/7 | Couple of aerials 8/9 | Quadrant of wheel transmitter |
|---|---|---|
| +1 | 0 | A |
| 0 | +1 | B |
| 0 | −1 | C |
| −1 | 0 | D |

Any signal whose logic corresponds to one of the four cases in the table is considered valid. On the other hand, any other combination is rejected.

Figure 5:
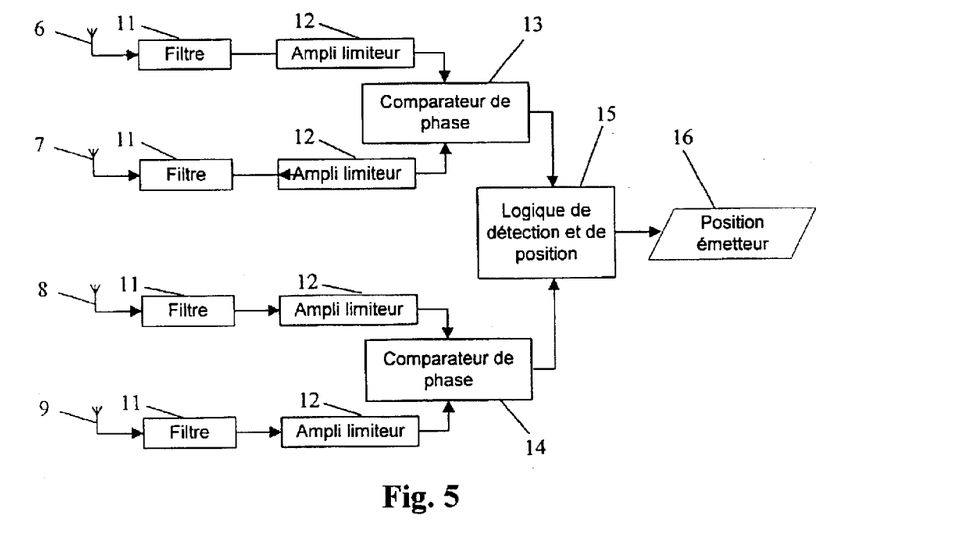
FIG. 5 is a diagram of a first locating device according to an embodiment of the invention.

FIG. 5 shows a diagram of a locating device according to one embodiment of the invention. This device comprises four reception channels of the radio signal. Each is composed of a helical aerial 6, 7, 8 and 9, of a filter 11 and of a limiting amplifier 12 intended to norm the amplitude of the signals. Two phase comparators, 13 and 14, receive the signals two by two. The comparator 13 compares the signals received by the aerials 6 and 7; the comparator 14 the signals received by the aerials 8 and 9. The locating device also comprises means 15 for processing the data transmitted by the two comparators. These processing means, such as a microcomputer, implement the detection and position logic and transmit to the central processing unit (not shown) of the tire monitoring system the position of the radio transmitter 16

Figure 6:
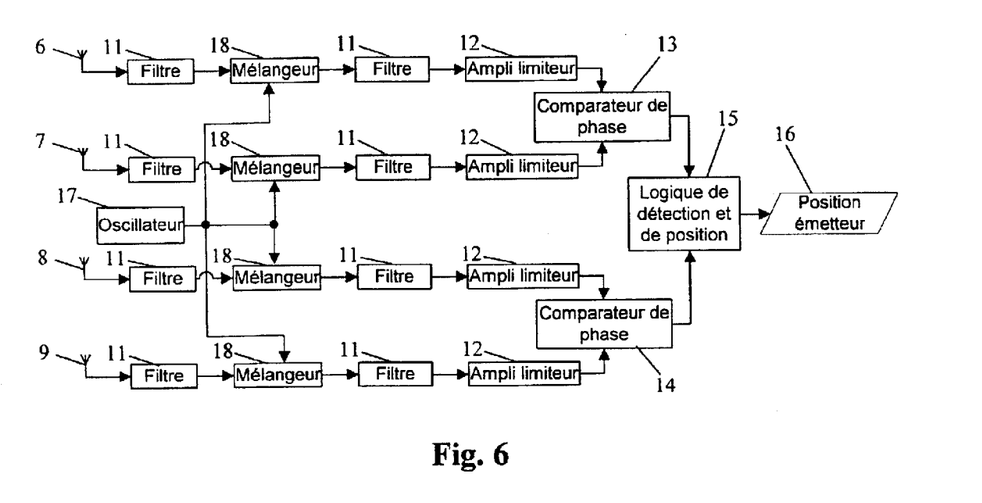
FIG. 6 is a diagram of a second locating device according to an embodiment of the invention.

FIG. 6 shows a second embodiment of the present invention, in which each channel further comprises a frequency mixer 18 connected to a common oscillator 17. The output of the mixer used is the output F–F2, F being the frequency of the radio signal and F2 the frequency of the oscillator. If the value of F is 433 MHz, a mixer with a frequency of 423 MHz can be used. F–F2 is then 10 MHz, and the cost of the phase comparators is much reduced. Such a reception channel uses the principle of superheterodyne receivers.

Figure 7:
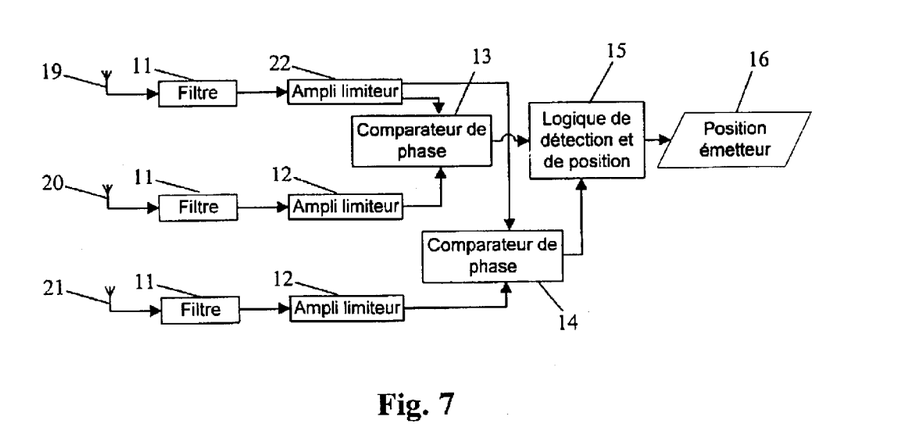
FIG. 7 is a diagram of a third locating device according to an embodiment of the invention having three reception aerials.
Figure 8:
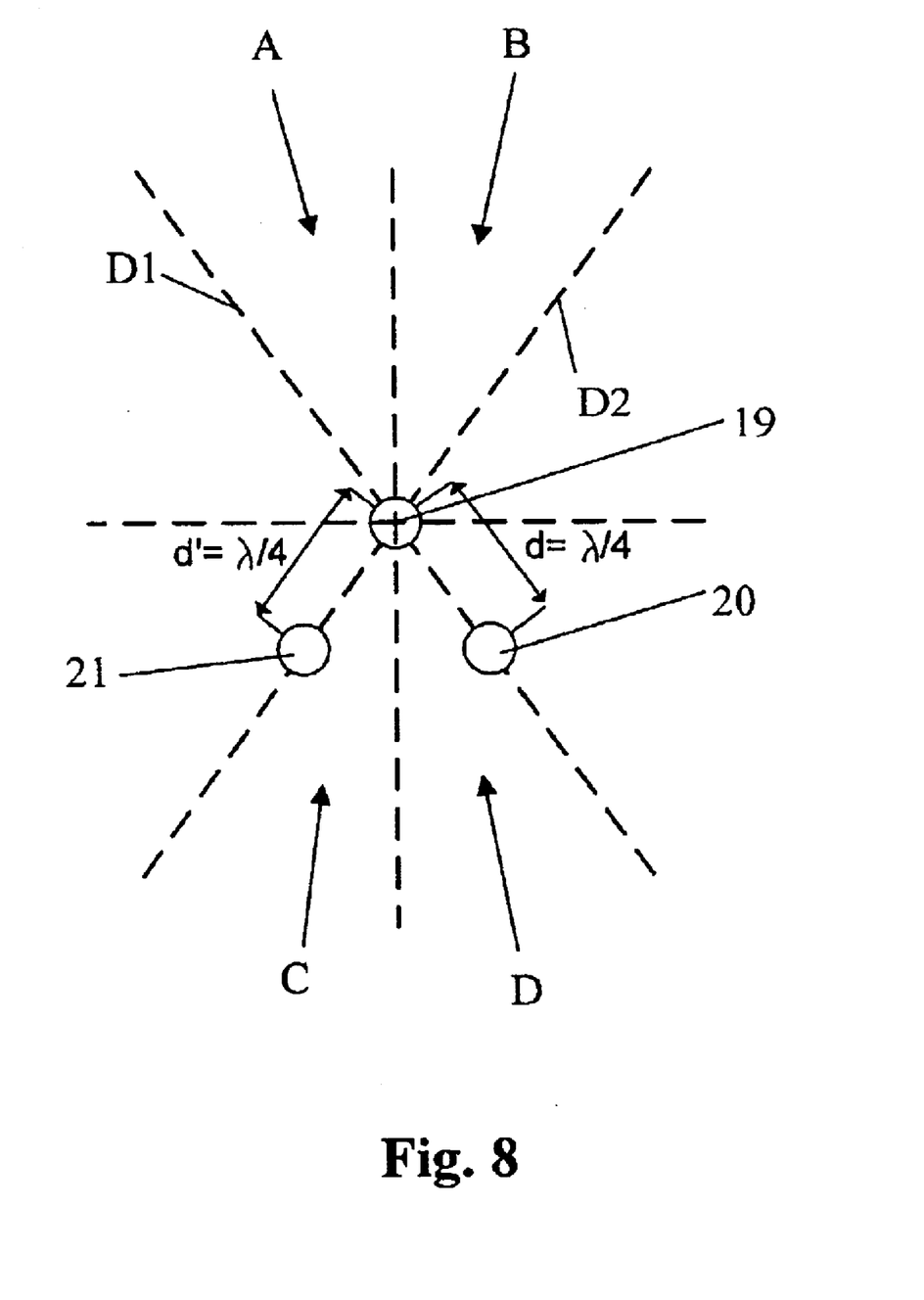
FIG. 8 illustrates, in the case of a four-wheel vehicle, the arrangement of reception aerials of a three-aerial device.

FIGS. 7 and 8 show a locating device according to the invention for a four-wheel vehicle comprising three aerials instead of four.

FIG. 8 shows the position of the three aerials at the center of the vehicle. The axes D1 and D2 corresponding substantially to the two diagonals connected the wheels two by two are shown in the figure. The aerial 19 is preferably located at the intersection of the two axes D1 and D2, the aerial 20 on the axis D1 and the aerial 21 on the axis D2. The first couple of co-operating aerials consists of the aerials 19 and 20 disposed on D1. The second couple consists of the aerials 19 and 21 disposed on D2. As above, the distance d between the aerials 19 and 20 is substantially equal to $\lambda/4$. The distance d' between the aerials 19 and 21 is also substantially equal to $\lambda/4$.

FIG. 7 shows a diagram of such a device. This diagram is similar to that of FIG. 5. However, in FIG. 7, the reception channel comprising the aerial 19 comprises a limiting amplifier 22, which is connected to the two phase comparators 13 and 14 instead of a single one as above. It is thus possible to simplify the realization of this device.

The operation of this device with three reception aerials is similar to that of the preceding devices with four aerials.

The operation of a system for monitoring pressure equipped with a device according to the invention for a four-wheel vehicle is the following:

the signal received is analyzed by a couple of aerials arranged diagonally;

the couple of co-operating aerials is determined, which receives signals phase-shifted through 90 degrees; this determines the axis D1 or D2 on which is located the wheel transmitter of the signals received;

in this couple of co-operating aerials, the aerial is determined which receives a signal ahead of phase; this identifies the quadrant of the plane containing D1 and D2 where the radio transmitter is;

it is checked with a reference table that the position of the wheel transmitter concerned has not changed; and the position of the wheel transmitter is transmitted to the central processing unit in order to analyze and process the data, in particular of pressure and temperature, included in the signals transmitted.

In order to make identification reliable, the position of the transmitter can only be indicated if one aerial receives a signal ahead of phase and if the other pair of aerials receives two signals of identical phase.

Statistical processing is obviously necessary in order to eliminate the reception of any parasitic echoes produced in certain azimuthal positions of the wheel.

The distance d of the diagonal between two aerials can be reduced to $\frac{1}{8}$ of a wavelength or 9 cm without much affecting the precision of the system.

One of the reception channels can be used for receiving all the data from the four wheel transmitters and their transmission to the central processing unit of the system.

The locating device according to the invention has the advantage of permitting automatic location, and without manual intervention, of the respective position of each wheel transmitter at the moment of initialization of the system for monitoring the tire pressure. The central processing unit may also know and store the identification codes of the four wheel units used by the vehicle in question.

In normal operation of the monitoring system, it is possible with the device according to the invention to carry out permanent monitoring of these identification codes. This may make it possible to program the central processing unit to give warning of a problem, for example in the case of inadvertent swapping of the wheels by a garage. Automatic re-initialization of the system for monitoring pressure may also be effected after a wheel change.

The device according to the invention may be contained in a small housing. It is preferably placed at the center of the vehicle, under the chassis or in the central part of the ceiling of the passenger cell. This housing may also associate all the tire monitoring functions, i.e. incorporate the central processing unit of the system and communicate direct with the display system of the vehicle.

The present invention can be variously modified without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The disclosures of each reference cited above is herein incorporated by reference.

I claim:

1. A system for monitoring the tires of a vehicle having two axles, each axle having a tire-wheel assembly and the two tire-wheel assemblies defining an axis D1, said system comprising:

a wheel unit disposed in each tire-wheel assembly comprising a radio transmitter capable of transmitting waves of a frequency F of more than 300 MHz in short pulses, a central unit for processing data transmitted by the radio transmitter a device for automatically locating the position on the vehicle of the radio transmitters, wherein the automatic locating device comprises:

a first radio reception channel having a first aerial;

a second radio reception channel having a second aerial, the first and second aerials defining an axis that is substantially parallel to D1, said first and second aerials being separated by a distance d, wherein d satisfies the following equation:

$(2n+1)\lambda/4-\lambda/8 \leq d \leq (2n+1)\lambda/4+\lambda/8$, n being an integer greater than or equal to 0, wherein $\lambda$ is the wavelength of the frequency F of the radio transmissions of the transmitters;

a first means of comparison of the phases of a radio signal received by the first and second aerials in order to determine whether the radio signal received by the first aerial is ahead of phase, behind phase or has an identical phase relative to the radio signal received by the second aerial; and a means of processing the results transmitted by the first means of comparison to indicate the position of the radio transmitter relative to the said aerials.

2. The system according to claim 1, in which d is substantially equal to $\lambda/4$.

3. A system for monitoring the tires of a vehicle having two axles, each axle having two tire-wheel assemblies, and the four tire-wheel assemblies defining two diagonal axes D1 and D2, said system comprising:

a wheel unit disposed in each tire-wheel assembly comprising a radio transmitter capable of transmitting waves of a frequency F of more than 300 MHz in short pulses, a central unit for processing the data transmitted by the radio transmitters, and a device for automatically locating the position on the vehicle of the radio transmitters wherein the automatic locating device comprises:

a first radio reception channel having a first aerial;

a second radio reception channel having a second aerial, the first and second aerials defining an axis that is intended to be substantially parallel to D1, said first and second aerials being separated by a distance d, wherein d satisfies the following equation:

$$(2n+1)\lambda/4 - \lambda/8 \leq d \leq (2n+1)\lambda/4 + \lambda/8,$$

n being an integer greater than or equal to 0; wherein $\lambda$ is the wavelength of the frequency F of the radio transmissions of the transmitters;

a first means of comparison of the phases of a radio signal received by the first and second aerials in order to determine whether the radio signal received by the first aerial is ahead of phase, behind phase or has an identical phase relative to the radio signal received by the second aerial;

a third radio reception channel having a third aerial;

a fourth radio reception channel having a fourth aerial, the third and fourth aerials defining an axis intended to be disposed substantially parallel to D2, said third and fourth aerial being separated by a distance d' such that, $\lambda$ being the wavelength of the frequency F of the radio transmissions of the transmitters, d' satisfies the following equation:

$$(2n+1)\lambda/4 - \lambda/8 \leq d' \leq (2n+1)\lambda/4 + \lambda/8,$$

n being an integer greater than or equal to 0;

a second means of comparing the phases of a radio signal received by the third and fourth aerials in order to determine whether the radio signal received by the third aerial is ahead of phase, behind phase or has an identical phase relative to the radio signal received by the fourth aerial;

a means of processing the results originating from the first and second means of comparison intended to indicate the position of the radio transmitter of the signal relative to the said aerials.

4. The system according to claim 3, wherein the third and first channels are shared.

5. The system according to claim 3, wherein the distances d and d' are substantially equal to $\lambda/4$.

6. The system according to claim 2, wherein:

when the first means of comparison determine that the radio signal received by the first aerial is ahead of phase relative to the radio signal received by the second aerial, the processing means indicate that the radio transmitter is disposed on the side of the first aerial relative to the axis D1; and when the first means of comparison determine that the radio signal received by the first aerial is behind phase relative to the radio signal received by the second aerial, the processing means indicate that the radio transmitter is disposed on the side of the second aerial relative to the axis D1.

7. The system according to claim 6, wherein when the first means of comparison determine that the radio signal received by the first and second aerials are substantially in phase, the processing means indicate that the radio transmitter is disposed substantially at an equal distance from the first and second aerial.

8. The system according to claim 5, wherein:

when the second means of comparison determine that the radio signal received by the third aerial is ahead of phase relative to the radio signal received by the fourth aerial, the processing means indicate that the radio transmitter is disposed on the side of the third aerial relative to the axis D2; and when the second means of comparison determine that the radio signal received by the third aerial is behind phase relative to the radio signal received by the fourth aerial, the processing means indicate that the radio transmitter is disposed on the side of the fourth aerial relative to the axis D2.

9. The system according to claim 8, wherein when the second means of comparison determine that the radio signals received by the third and fourth aerials are substantially in phase, the processing means indicate that the radio transmitter is disposed substantially at an equal distance from the third and fourth aerials.

10. The system according to claim 5, wherein the processing means indicate that the radio transmitter is disposed, relative to an axis D1 or D2 respectively, on the side of a given aerial only if the second, or first, means of comparison record that the signals received by the corresponding pair of aerials have substantially the same phase shift.

11. The system according to claim 5, wherein the processing means indicate "zero signal" when the first and second means of comparison both record that the signals received by the corresponding pairs of aerials are substantially in phase.

12. The system according to claim 1, wherein the aerials comprise a helical winding such that the unwound length of the wire of the winding is substantially equal to $\lambda/4$.

13. The system according to claim 12, wherein the windings of the aerials have their axes intended to be disposed perpendicular to the axes D1 and D2.

14. The system according to claim 1, wherein each reception channel comprises a limiting amplifier.

15. The system according to claim 1, wherein each reception channel further comprises a frequency mixer connected to a local oscillator of frequency F2, which oscillator is common to all reception channels of the radio signal.

16. The system according to claim 1, wherein one of the reception channels of the radio signal of the locating device is used to receive and decode the data originating from the wheel unit transmitting to the central processing unit.

17. The system according to claim 1, wherein a complementary reception channel receives and decodes the data from the wheel unit transmitting to the central processing unit.

18. The system according to claim 1, wherein the locating device is disposed in the central part of the ceiling of the passenger compartment.

* * * * *